United States Patent
Agostini

(10) Patent No.: US 11,565,651 B2
(45) Date of Patent: Jan. 31, 2023

(54) AIRBAG FOR A VEHICLE OCCUPANT RESTRAINT SYSTEM

(71) Applicant: TRW Automotive GmbH, Alfdorf (DE)

(72) Inventor: Christian Agostini, Aalen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 151 days.

(21) Appl. No.: 16/478,919

(22) PCT Filed: Jan. 11, 2018

(86) PCT No.: PCT/EP2018/050659
§ 371 (c)(1),
(2) Date: Jul. 18, 2019

(87) PCT Pub. No.: WO2018/134114
PCT Pub. Date: Jul. 26, 2018

(65) Prior Publication Data
US 2019/0381969 A1 Dec. 19, 2019

(30) Foreign Application Priority Data
Jan. 20, 2017 (DE) ..................... 10 2017 101 085.8

(51) Int. Cl.
*B60R 21/2338* (2011.01)
(52) U.S. Cl.
CPC ..................... *B60R 21/2338* (2013.01); *B60R 2021/23382* (2013.01)
(58) Field of Classification Search
CPC .................. B60R 21/2338; B60R 2021/23382
See application file for complete search history.

(56) References Cited

U.S. PATENT DOCUMENTS 6,296,276 B1 10/2001 Ritter
6,299,965 B1 * 10/2001 Keshavaraj ........... B29C 66/439
139/389

(Continued)

FOREIGN PATENT DOCUMENTS

DE 19654490 6/1998
DE 10045344 3/2001
(Continued)

*Primary Examiner* — James A English
*Assistant Examiner* — Joselynn Y Sliteris
(74) *Attorney, Agent, or Firm* — Tarolli, Sundheim, Covell & Tummino LLP

(57) ABSTRACT

An airbag (10) for a vehicle occupant restraint system comprises at least two opposite fabric layers (12, 14) which delimit at least one chamber (18) adapted to be filled with gas and comprises at least two spacers (20a, 20b, 20c, 20d) which, in the inflated state of the airbag (10), delimit the distance of the fabric layers (12, 14) from each other, wherein the spacers (20a, 20b, 20c, 20d) are formed by threads which in a connecting area (22a, 22b, 22c, 22d, 24a, 24b, 24c, 24d) are connected to a fabric layer (12, 14), extend in the direction of the opposite fabric layer (14, 12) and in a further connecting area (24a, 24b, 24c, 24d, 22a, 22b, 22c, 22d) are connected to the original or the opposite fabric layer (14, 12). A first connecting area (22b, 24a) and a second connecting area (22c, 24d) are arranged at the same fabric layer (12, 14) in the area of a joint constriction (30) located between two bulges (28) in the inflated state of the airbag (10), and a first spacer (20b, 20a) connected to the first connecting area (22b, 24a) and a second spacer (20c, 20d) connected to the second connecting area (22c, 24d) intersect in the area of the constriction (30) in the interior of the chamber (18) in a side view.

27 Claims, 1 Drawing Sheet

(56) References Cited

U.S. PATENT DOCUMENTS

| | | | |
|---|---|---|---|
| 6,494,486 B2* | 12/2002 | Pausch | B60R 21/23138 |
| | | | 280/730.2 |
| 9,868,412 B2* | 1/2018 | Yoshida | B60R 21/232 |
| 10,899,308 B2* | 1/2021 | Yoshida | D03D 3/04 |
| 2007/0040368 A1* | 2/2007 | Manley | B60R 21/231 |
| | | | 280/730.2 |
| 2007/0200329 A1 | 8/2007 | Ma | |
| 2015/0151710 A1 | 6/2015 | Tanaka et al. | |
| 2016/0368448 A1 | 12/2016 | Yoshida et al. | |

FOREIGN PATENT DOCUMENTS

| | | |
|---|---|---|
| GB | 2316370 | 2/1998 |
| WO | 0136184 | 5/2001 |

* cited by examiner

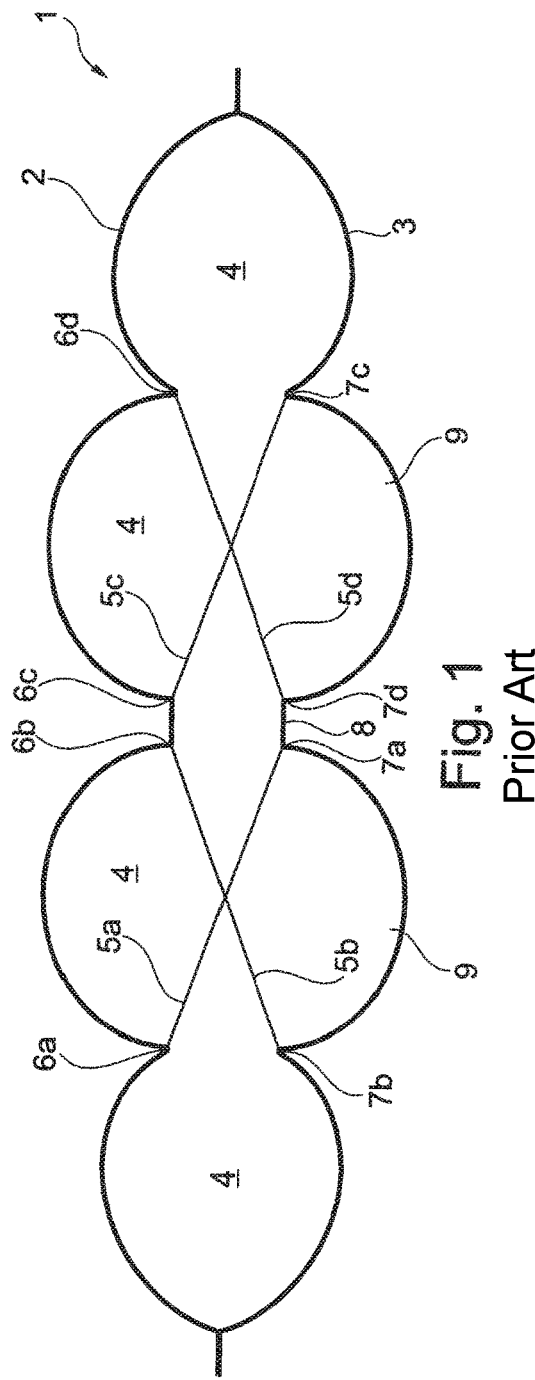
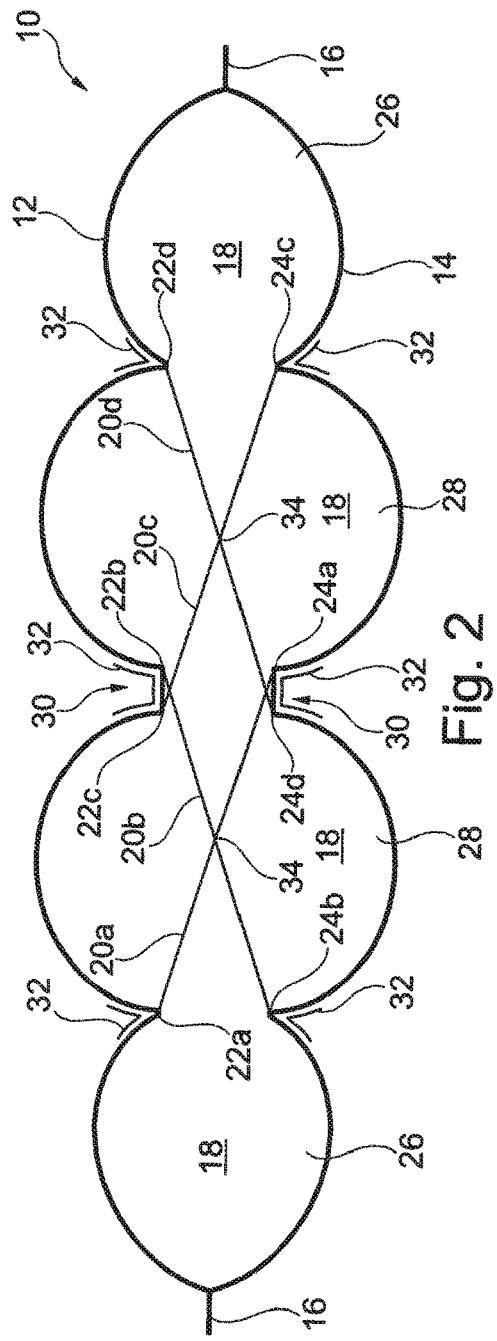

AIRBAG FOR A VEHICLE OCCUPANT RESTRAINT SYSTEM

RELATED APPLICATIONS

This application corresponds to PCT/EP2018/050659, filed Jan. 11, 2018, which claims the benefit of German Application No. 10 2017 101 085.0, filed Jan. 20, 2017, the subject matter of which are incorporated herein by reference in their entirety.

BACKGROUND OF THE INVENTION

The invention relates to an airbag for a vehicle occupant restraint system, comprising at least two opposite fabric layers which delimit at least one chamber adapted to be filled with gas and comprising at least two spacers which are connected to the fabric layers and, in the inflated state of the airbag, restrict the distance of the fabric layers from each other, wherein the spacers are formed by threads which are connected to a fabric layer in a connecting area, extend in the direction of the opposite fabric layer and, in a further connecting area, are connected to the original or the opposite fabric layer.

A generic airbag, which is a large-area side airbag, a so-called window bag, is known from EP 1 080 996 A2, for example. In said airbag the spacers delimiting the thickness of the airbag in the inflated state are formed by warp and, resp., weft threads of the airbag fabric layers themselves. Since the spacers are in the form of threads, they have hardly any influence on the flow inside the airbag.

FIG. 1 illustrates another side airbag 1 according to the state of the art in cross-section which is similar to the airbag known from EP 1 080 996 A2. The side airbag 1 includes two fabric layers 2, 3 opposite to each other which delimit a chamber 4 adapted to be filled with gas. In order to prevent the inflated airbag from becoming too thick and in order to restrict the amount of gas required for filling the airbag 1, plural spacers 5a, 5b, 5c and 5d are provided at the fabric layers 2, 3.

Said spacers are formed by threads and are connected to the fabric layer 2 in each of the connecting areas 6a, 6b, 6c and 6d and are connected to the fabric layer 3 in each of the connecting areas 7a, 7b, 7c and 7d. When viewed in cross-section, the threads 5a and 5b as well as the threads 5c and 5d intersect in the interior of each of the larger bulges of the chamber 4.

As is evident from FIG. 1, the spacers 5a to 5d, more exactly speaking the connection of the spacers 5b and 5c in the connecting areas 6b and, 6c and, resp., the connection of the spacers 5a and 5d in the connecting areas 7a and 7d in the inflated state result in a constriction 8 which is provided centrally at the airbag 1 between two bulges 9. In said connecting areas 6b, 6c as well as 7a, 7d relatively high tensions occur due to the connection of the spacers 5a to 5d.

SUMMARY OF THE INVENTION

Therefore, it is the object of the invention to develop the known airbag to the effect that the tensions in the connecting areas will be reduced.

In accordance with the invention, in an airbag of the type mentioned in the beginning a first connecting area and a second connecting area are provided to be arranged at the same fabric layer in the area of a joint constriction located in the inflated state of the airbag between two bulges, wherein, in a side view, a first spacer connected to the first connecting area and a second spacer connected to the second connecting area intersect in the area of the constriction inside the chamber. Since, according to the invention, the first and second spacers intersect in the area of the constriction, the two spacers do not expand but contract the fabric layer in the area of the constriction, thus reducing the tension in the connecting area due to the changed flux of force. Therefore, the airbag is less susceptible to leakage or even tearing of the fabric layers in and, resp., between the connecting areas.

Of preference, the first and second spacers intersect directly after leaving the joint fabric layer. This results in especially advantageous force conditions. It is noted that "leaving the fabric layer" in this context is tantamount to "entering the respective fabric layer", i.e. there is no "preferred direction" in the spacer. By "directly after leaving the fabric layer" it is merely meant that the spacers intersect close to the fabric layer.

According to a preferred embodiment, the first and second connecting areas are arranged in direct spatial vicinity to each other at the fabric layer, in particular they exhibit a maximum distance of 30 mm. In this way, a constriction between two adjacent bulges is resulting. If the spacers were arranged at a larger distance from each other, also the fabric between the spacers would bulge.

Preferably, the first and second connecting areas delimit the constriction located between the bulges in the inflated state of the airbag.

In an especially preferred configuration, the spacers are formed by some of the wart and/or weft threads forming the fabric layers which, related to the inflated state, leave the area formed by their assigned fabric layer in a connecting area, extend in the direction of the opposite fabric layer and are connected to warp and/or weft threads of the opposite fabric layer. The technique of partially interweaving fabric layers allows to position the spacers at any points. Moreover, the individual warp and/or weft threads only slightly obstruct the flow inside the airbag in the area where they act as spacers. In this way, the gas may flow between the individual threads and may lead to rapid deployment of the airbag. The cost-efficient and variable technique of integral interweaving allows to manufacture even large-area airbags at low cost.

In particular, the spacers are formed without any parts to be fastened to the fabric layers, but by some of the warp and/or weft threads producing the fabric layer itself which, related to the inflated state, leave the fabric bond so that the assigned fabric layer becomes incomplete. Thus, the spacers are no separate members to be fastened to the fabric layers but are integral parts of the fabric layers. The warp and/or weft threads forming the spacer are missing in the connecting area of the spacer in the fabric layer assigned to the same. In this way, the fabric layer becomes less gastight in this area. The latter fact may be deliberately used to assign a particular gas permeability to the outer airbag panel.

Alternatively, it is imaginable, of course, to use separate threads connected to the fabric layers which do not belong to the fabric bond as spacers, such as so-called pile threads. Equally, the threads forming the spacers may be interlaced, welded or otherwise connected to the fabric.

In a preferred development, at least one fabric layer is coated at least in the area of the spacers, especially by a film applied to the outside. This helps to prevent, especially for spacers formed by warp and, resp., weft threads of the fabric layers, the gas permeability from excessively increasing in the connecting areas. Especially for side airbags which are intended to be tightly filled for a quite long period, said coating with a film, for example, is useful. In addition, this allows to provide numerous spacers, for due to the coating it is no longer a drawback, regarding the gas permeability, when the outer panel has only few threads in the area of the spacers. The fabric itself thus forms substantially a supporting structure only, whereas the actual gas tightness is obtained by the coating, especially the film.

In a preferred configuration, the threads acting as spacers leave the area formed by their assigned fabric layer and, after forming the respective spacer, merge into the opposite fabric layer. It is insignificant in this context whether the spacers are formed by warp and, resp., weft threads of the fabric layer or by additional threads.

As an alternative, it is imaginable that, after forming the spacer, the threads merge into the fabric layer assigned to them again, wherein then they must be connected, in the area of the spacer, to threads assigned to the opposite fabric layer, however.

Preferably, two spacers at a time form an X shape in the inflated state of the airbag and when viewed in cross-section, as threads extend from both opposite fabric layers in the direction of the respective other fabric layer. In the case of warp and, resp., weft threads as spacers, several warp and, resp., weft threads of both opposite fabric layers thus leave the surface area formed by their assigned fabric layer in the direction of the opposite fabric layer.

In another configuration, threads extend from both opposite fabric layers in the direction of the respective other fabric layer and, for jointly forming a spacer between the fabric layers, are connected, especially by interweaving, at least in portions in the area of the respective spacer. In this way, for example spacers taking an X, Y or H shape when viewed in cross-section, can be produced.

Especially preferred, the threads forming a spacer then take an X shape in the inflated state of the airbag and when viewed in cross-section, as the threads forming the spacer extend toward each other and past each other from opposite fabric layers and finally merge into the opposite fabric layer. In this case, too, warp and, resp., weft threads or else additional threads, so-called pile threads, can be used. Of course, the threads forming the spacers may also be interlaced, welded or otherwise connected to the fabric.

Alternatively, it is also imaginable in this case to interweave the threads assigned to the different fabric layers inside the chamber and then to let them return into their original fabric layer.

As already mentioned in the beginning, the airbag preferably is a large-area side airbag having one or more chambers, wherein the fabric layers are integrally interwoven to form the chambers and/or the outer periphery, and wherein in at least one chamber spacers are provided. The spacers help to further reduce the thickness of the airbag, even in the case of plural chambers having a small cross-section, and to decrease to the dimension required for restraint. The cost-efficient and variable technique of integral interweaving allows to manufacture even large-area airbags at low cost.

BRIEF DESCRIPTION OF THE DRAWINGS

Further features and advantages will be resulting from the following description of a preferred embodiment by way of the enclosed drawings, wherein:

FIG. 1 shows a cross-sectional view of an inflated head-side airbag according to the state of the art; and FIG. 2 shows a cross-sectional view of a head-side airbag according to the invention.

DESCRIPTION

FIG. 2 illustrates an airbag 10 according to the invention for a vehicle occupant restraint system which is a large-area head-side airbag.

The airbag 10 includes two opposite fabric layers 12, 14 which are integrally interwoven in the area of their outer periphery 16. Thus, a chamber 18 is formed which is delimited by the fabric layers 12, 14 and, in the case of release, can be filled with gas. As an alternative to the illustrated configuration, the airbag 10 may also have plural chambers, of course.

Inside the airbag 10 and, resp., inside the chamber 18 there are provided a total of four spacers 20a, 20b, 20c and 20d restricting the distance of the fabric layers 12, 14 from each other in the shown inflated state of the airbag 10.

Each of the spacers 20a to 20d is formed by plural threads which, in the shown cross-sectional view, are successively arranged and are connected to the fabric layer 12 in the connecting areas 22a, 22b, 22c and, resp., 22d.

From said connecting areas 22a to 22d the spacers 20a to 20d extend in the direction of the opposite fabric layer 14 and there are connected to the latter in the connecting areas 24a, 24b, 24c and 24d.

In the airbag 10, a total of four bulges 26 and, resp., 28 are formed by the spacers, wherein between the two central bulges 28 a constriction 30 is located in the area of which the first connecting area 22b assigned to the first spacer 20b as well as the connecting area 22c assigned to the second spacer 20c are located at the same fabric layer 12.

At the opposite fabric layer 14, a similar situation is given in the area of the constriction 30, in this case the first spacer 20a is connected to the first connecting area 24a, while the second spacer 20d is connected to the second connecting area 24d.

Accordingly, the respective spacers 20b and 20c and, resp., 20a and 20d connected to the same fabric layer 12 and, resp., 14 intersect in the area of the constriction 30 inside the chamber 18 directly after leaving the joint fabric layer 12 and, resp., 14.

The connecting areas 22b and 22c and, resp., 24a and 24d are arranged in direct spatial vicinity to each other at the respective fabric layer 12 and, resp., 14, especially they have a maximum distance of 60 mm from each other.

The crossing of the spacers 20b and 20c and, resp., 20a and 20d directly after leaving the respective assigned fabric layer 12 and, resp., 14 results in a reduction of the tension in the connecting areas, which efficiently prevents increased leakage or even tearing of the fabric layers 12, 14.

From FIG. 2, it is moreover evident that the first and second connecting areas 22b and 22c and, resp., 24a and 24d delimit the constriction 30 located between the bulges 28 in the inflated state of the airbag 10.

In the shown embodiment, the spacers 20a to 20d are formed by several of the warp and/or weft threads forming the fabric layers 12 and, resp., 14 which leave the surface area formed by their assigned fabric layer 12, 14 in the respective connecting area 22a to 22d and, resp., 24a to 24d, extend in the direction of the opposite fabric layer 14 and, resp., 12 and are connected to warp and/or weft threads of said opposite fabric layer 14 and, resp., 12.

In particular, the threads acting as spacers 20a to 20d merge into the opposite fabric layer after forming the spacer. Hence, in this case the spacers 20a to 20d are formed without any parts to be fastened to the fabric layers 12, 14, but by several of the warp and/or weft threads producing the fabric layer 12 and, resp., 14 itself which leave the fabric bond so that the assigned fabric layer 12, 14 becomes incomplete.

In order to prevent increased leakage in the connecting areas 22a to 22d and, resp., 24a to 24d, the fabric layers 12, 14 are coated on the outside, namely by a film 32 applied to the outside which in FIG. 2 is indicated only in the area of the connecting areas 22a to 22d and, resp., 24a to 24d.

Two spacers at a time, viz. the spacers 20a and 20b as well as 20c and 20d, in the inflated state of the airbag 10 and when viewed in cross-section form an X shape, as from both opposite fabric layers 12, 14 threads extend in the direction of the respective other fabric layer 14 and, resp., 12.

As an alternative, it is also imaginable that threads extend from both opposite fabric layers 12 and, resp., 14 in the direction of the respective other fabric layer and are interconnected, especially by interweaving, at least in portions in the area of the respective spacer for jointly forming a spacer between the fabric layers 12, 14. In the case of the spacers 20a and 20b, this would mean that they are interwoven in the intersecting area 34. Even such integrally formed spacer then would take an X shape in the inflated state of the airbag 10 and when viewed in cross-section, as the threads extend toward each other and past each other from opposite fabric layers and finally merge into the opposite fabric layer.

The invention claimed is:

1. An airbag for a vehicle occupant restraint system, comprising:
    at least two opposite fabric layers delimiting at least one chamber adapted to be filled with gas, and
    at least two spacers which are connected to the fabric layers and, in the inflated state of the airbag, restrict a distance of the fabric layers from each other, wherein the spacers are formed by threads which in a connecting area are connected to a fabric layer, extend in a direction of the opposite fabric layer and in a further connecting area are connected to the opposite fabric layer,
    wherein a first connecting area and a second connecting area are arranged at the same fabric layer in an area of a joint constriction located between two bulges in the inflated state of the airbag, and
    wherein a first spacer connected to the first connecting area and a second spacer connected to the second connecting area in a side view intersect in the area of the constriction in the interior of the airbag, the first spacer intersecting a third spacer in the interior of the airbag, and wherein the first spacer intersects the third spacer in a first one of the bulges in the interior of the airbag, the second spacer intersecting a fourth spacer in a second one of the bulges in the interior of the airbag.

2. The airbag according to claim 1, wherein the first and second spacers intersect directly after leaving the fabric layer.

3. The airbag according to claim 1, wherein the first and second connecting areas are arranged at the same fabric layer in direct spatial vicinity to each other, and have a maximum distance of 60 mm.

4. The airbag according to claim 1, wherein the first and second connecting areas delimit the constriction located between the bulges in the inflated state of the airbag.

5. The airbag according to claim 1, wherein the spacers are formed by several warp and/or weft threads that form the fabric layers, the spacers, in the inflated state, leaving a surface area formed by their assigned fabric layer in a connecting area, and extending in a direction of the opposite fabric layer and are connected to warp and/or weft threads of the opposite fabric layer.

6. The airbag according to claim 5, wherein the spacers are formed without any parts to be fastened to the fabric layers but by several of the warp and/or weft threads that form the fabric layers, wherein the warp and/or weft threads being used to form the spacers instead of the fabric layers causes the fabric layer at each connecting area to be lacking warp and/or weft threads and materially incomplete.

7. The airbag according to claim 1, wherein at least one fabric layer is coated at least in an area of the spacers by a film applied to an outside of the at least one fabric layer.

8. The airbag according to claim 1, wherein the threads acting as spacers leave a surface area formed by one of the fabric layers from which they originate and, after forming the respective spacer, merge into the other fabric layer.

9. The airbag according to claim 8, wherein two spacers at a time in the inflated state of the airbag and viewed in cross-section take an X shape, as threads extend from both opposite fabric layers in the direction of the respective other fabric layer.

10. The airbag according to claim 1, wherein threads extend from both opposite fabric layers in the direction of the respective other fabric layer and are interconnected by interweaving, at least in portions in an area of each respective spacer for jointly forming the spacers between the fabric layers.

11. The airbag according to claim 10, wherein the threads forming two spacers take an X shape in the inflated state of the airbag and when viewed in cross-section, as the threads forming the two spacers extend toward each other and past each other from opposite fabric layers and finally merge into the opposite fabric layer.

12. The airbag according to claim 1, wherein the airbag is a large-area side airbag having one or more chambers, wherein the fabric layers are integrally interwoven for forming the chambers and/or the outer periphery, and wherein spacers are provided in at least one chamber.

13. The airbag according to claim 1, wherein the spacers are formed by several warp and/or weft threads that form the fabric layers and without any parts to be fastened to the fabric layers.

14. The airbag according to claim 1, wherein a third connecting area and a fourth connecting area are arranged at the same fabric layer in an area of a second joint constriction, the third and fourth connecting areas being arranged on the fabric layer that is opposite to the fabric layer that the first and second connecting areas are arranged;
    wherein the third spacer is connected to the third connecting area and the fourth spacer is connected to the fourth connecting area, the third and fourth spacers in a side view intersecting in the area of the second constriction in the interior of the airbag.

15. An airbag for a vehicle occupant restraint system, comprising:
    at least two opposite fabric layers delimiting at least one chamber adapted to be filled with gas, and
    at least two X-shaped spacers which are connected to the fabric layers and, in the inflated state of the airbag, restrict a distance of the fabric layers from each other, wherein the X-shaped spacers are formed by threads which in a connecting area are connected to a fabric layer, extend in a direction of the opposite fabric layer and in a further connecting area are connected to the opposite fabric layer, wherein each of the X-shaped spacers is defined by a first portion of the threads being interwoven with a second portion of the threads at an intersecting area between the at least two opposite fabric layers, wherein a first connecting area and a second connecting area are arranged at the same fabric layer in an area of a joint constriction located between two bulges in the inflated state of the airbag, and wherein a first X-shaped spacer connected to the first connecting area and a second X-shaped spacer connected to the second connecting area in a side view intersect in the area of the constriction in the interior of the airbag.

16. The airbag according to claim 15, wherein the first and second spacers intersect directly after leaving the fabric layer.

17. The airbag according to claim 15, wherein the first and second connecting areas are arranged at the same fabric layer in direct spatial vicinity to each other, and have a maximum distance of 60 mm.

18. The airbag according to claim 15, wherein the first and second connecting areas delimit the constriction located between the bulges in the inflated state of the airbag.

19. The airbag according to claim 15, wherein the spacers are formed by several warp and/or weft threads that form the fabric layers, the spacers, in the inflated state, leaving a surface area formed by their assigned fabric layer in a connecting area, and extending in a direction of the opposite fabric layer and are connected to warp and/or weft threads of the opposite fabric layer.

20. The airbag according to claim 19, wherein the spacers are formed without any parts to be fastened to the fabric layers but by several of the warp and/or weft threads that form the fabric layers, wherein the warp and/or weft threads being used to form the spacers instead of the fabric layers causes the fabric layer at each connecting area to be lacking warp and/or weft threads and materially incomplete.

21. The airbag according to claim 15, wherein at least one fabric layer is coated at least in an area of the spacers by a film applied to an outside of the at least one fabric layer.

22. The airbag according to claim 15, wherein the threads acting as spacers leave a surface area formed by one of the fabric layers from which they originate and, after forming the respective spacer, merge into the other fabric layer.

23. The airbag according to claim 22, wherein each of the two spacers at a time in the inflated state of the airbag and viewed in cross-section take an X shape, as threads extend from both opposite fabric layers in the direction of the respective other fabric layer.

24. The airbag according to claim 15, wherein threads extend from both opposite fabric layers in the direction of the respective other fabric layer and are interconnected by interweaving, at least in portions in an area of each respective spacer for jointly forming the spacers between the fabric layers.

25. The airbag according to claim 24, wherein the threads forming each spacer take an X shape in the inflated state of the airbag and when viewed in cross-section, as the threads forming each spacer extend toward each other and past each other from opposite fabric layers and finally merge into the opposite fabric layer.

26. The airbag according to claim 15, wherein the airbag is a large-area side airbag having one or more chambers, wherein the fabric layers are integrally interwoven for forming the chambers and/or the outer periphery, and wherein spacers are provided in at least one chamber.

27. The airbag according to claim 15, wherein the spacers are formed by several warp and/or weft threads that form the fabric layers and without any parts to be fastened to the fabric layers.

* * * * *